United States Patent
Chauhan et al.

(10) Patent No.: US 11,037,155 B2
(45) Date of Patent: Jun. 15, 2021

(54) SECURITY TOOL

(71) Applicant: Bank of America Corporation, Charlotte, NC (US)

(72) Inventors: Sandeep Chauhan, Hyderabad (IN); Ravi Kumar Kesani, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/049,094

(22) Filed: Jul. 30, 2018

(65) Prior Publication Data
US 2020/0034846 A1    Jan. 30, 2020

(51) Int. Cl.
*G06Q 20/40* (2012.01)
*G06F 21/60* (2013.01)
*H04L 29/06* (2006.01)

(52) U.S. Cl.
CPC ..... *G06Q 20/40145* (2013.01); *G06F 21/602* (2013.01); *H04L 63/0861* (2013.01)

(58) Field of Classification Search
CPC ............................................... G06Q 20/40145
See application file for complete search history.

(56) References Cited

U.S. PATENT DOCUMENTS

| | | | |
|---|---|---|---|
| 7,387,250 B2 | 6/2008 | Muni | |
| 8,549,578 B2 | 10/2013 | Herigstad et al. | |
| 8,905,303 B1* | 12/2014 | Ben Ayed | G06Q 20/32 235/380 |
| 9,594,751 B1 | 3/2017 | Gill et al. | |
| 2004/0010806 A1* | 1/2004 | Yuen | G09F 27/00 725/136 |
| 2006/0101499 A1 | 5/2006 | Aravamudan et al. | |
| 2012/0089521 A1 | 4/2012 | Abrevaya et al. | |
| 2013/0347013 A1* | 12/2013 | Sivaraman | H04N 21/47815 725/5 |
| 2015/0112826 A1 | 4/2015 | Crutchfield, Jr. | |
| 2015/0172292 A1* | 6/2015 | Kuang | H04L 63/0884 713/155 |
| 2015/0208132 A1* | 7/2015 | Low | G06Q 20/02 725/30 |
| 2016/0205439 A1 | 7/2016 | Bonovich et al. | |
| 2017/0286966 A1* | 10/2017 | Kohli | G06Q 20/407 |
| 2018/0060838 A1* | 3/2018 | Agrawal | G06Q 20/20 |
| 2018/0232734 A1* | 8/2018 | Smets | G06Q 20/32 |

\* cited by examiner

*Primary Examiner* — Edward Chang
*Assistant Examiner* — William D Newlon
(74) *Attorney, Agent, or Firm* — Michael A. Springs

(57) ABSTRACT

An apparatus includes a memory and a hardware processor. The memory stores security credentials of a user. The hardware processor receives a first message indicating that the user initiated a transaction through a television and in response to receiving the first message, loads an application. The hardware processor also authenticates the user through the application using the security credentials of the user, extracts, from the first message, a price and an identification of a merchant of the transaction, and initiates, through the application, a payment of the price to the merchant.

20 Claims, 3 Drawing Sheets

SECURITY TOOL

TECHNICAL FIELD

This disclosure relates generally to security and fraud prevention.

BACKGROUND

Computers and mobile devices are increasingly used to perform transactions with merchants. Some devices offer better security for these transactions than other devices.

SUMMARY OF THE DISCLOSURE

Computers and mobile devices are increasingly used to perform transactions with merchants. For example, users can use their mobile phones to initiate purchases and payments with merchants. Additionally, merchants can use connected and/or mobile terminals to accept and process payments. Some devices offer better security for these transactions than other devices. For example, mobile devices may perform certain types of authentication and encryption that other devices (e.g., cash registers, credit card scanners, etc.) will not perform. As a result, it may be more secure to pay for a transaction using a mobile device.

Furthermore, users use televisions to watch streaming videos. It is contemplated that these streams will include a layer to identify and present to the user offers for products that appear in these videos. The user can then purchase these products through the television. Televisions, however, typically do not perform the same types of authentication and encryption that other devices perform. As a result, the user's transaction through the television may not be secure and may result in the user being hacked or having the user's identity stolen.

This disclosure contemplates a security tool that improves the security of transactions initiated through a streamed video on a television. The security tool (e.g., a mobile device) listens for and receives messages from a network indicating that a transaction has been initiated on the television. In response, the security tool loads an application and extracts price and merchant information for the transaction from the message. The security tool then authenticates a user and initiates payment of the price to the merchant. In this manner, the sensitive portions of the transaction (e.g., payment) are not conducted through the television, but rather, through a device that can provide security for the user. Three embodiments of the security tool are described below.

According to an embodiment, an apparatus includes a memory and a hardware processor. The memory stores security credentials of a user. The hardware processor receives a first message indicating that the user initiated a transaction through a television and in response to receiving the first message, loads an application. The hardware processor also authenticates the user through the application using the security credentials of the user, extracts, from the first message, a price and an identification of a merchant of the transaction, and initiates, through the application, a payment of the price to the merchant.

According to another embodiment, a method includes storing, by a memory, security credentials of a user and receiving, by a hardware processor communicatively coupled to the memory, a first message indicating that the user initiated a transaction through a television. The method also includes in response to receiving the first message, loading, by the hardware processor, an application and authenticating, by the hardware processor, the user through the application using the security credentials of the user. The method further includes extracting, by the hardware processor, from the first message, a price and an identification of a merchant of the transaction and initiating, by the hardware processor, through the application, a payment of the price to the merchant.

According to yet another embodiment, a system includes a television and a security tool. The television presents a streamed video to a user and presents an offer for a product in the streamed video. The security tool stores security credentials of the user and receives a first message indicating that the user initiated a transaction for the product through the television when the television was presenting the streamed video. The security tool also in response to receiving the first message, loads an application and authenticates the user through the application using the security credentials of the user. The security tool further extracts, from the first message, a price and an identification of a merchant of the transaction and initiates, through the application, a payment of the price to the merchant.

Certain embodiments provide one or more technical advantages. For example, an embodiment improves the security of a transaction. As another example, an embodiment reduces the chances of identity theft. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
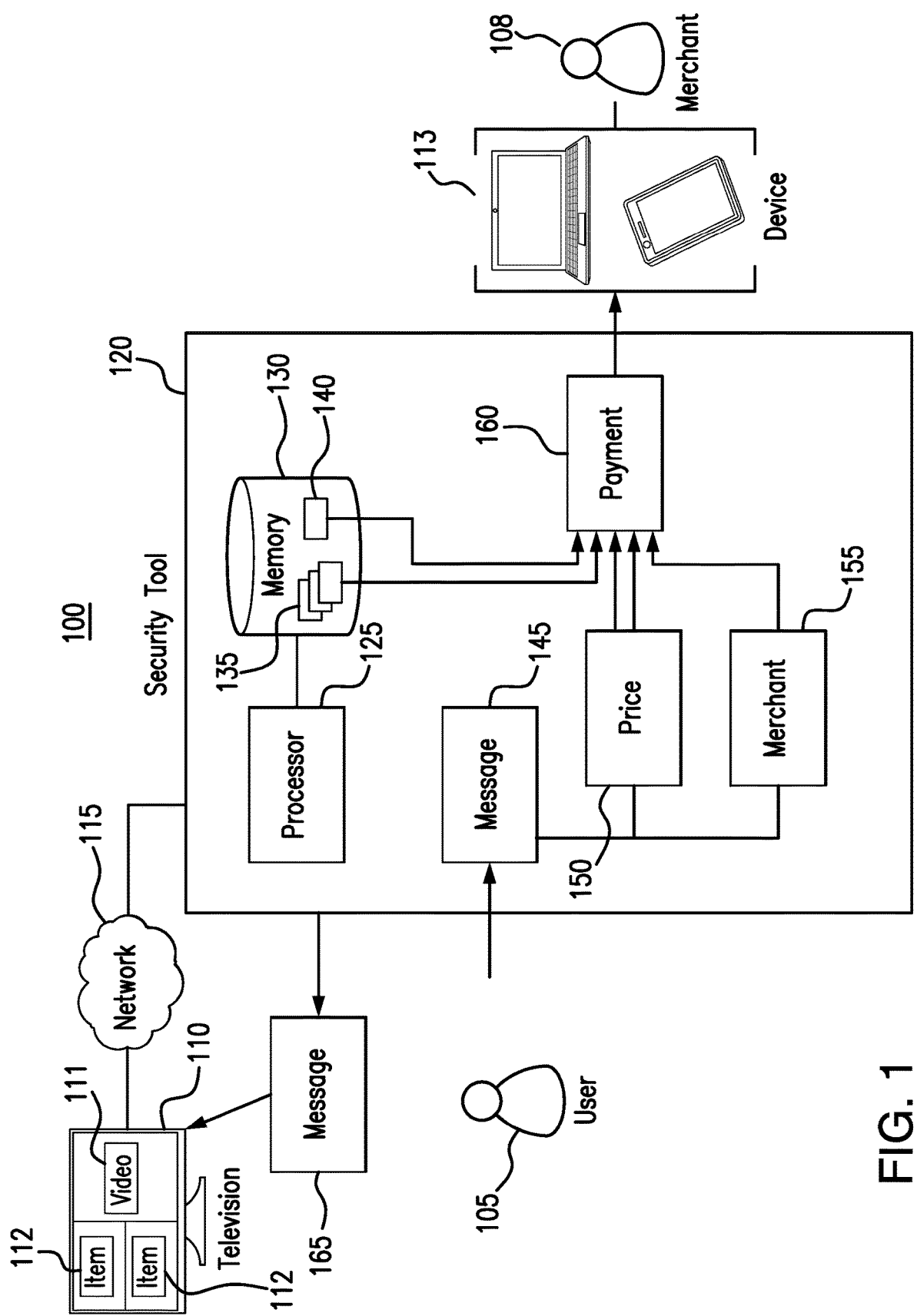
FIG. 1 illustrates an example system.
Figure 2:
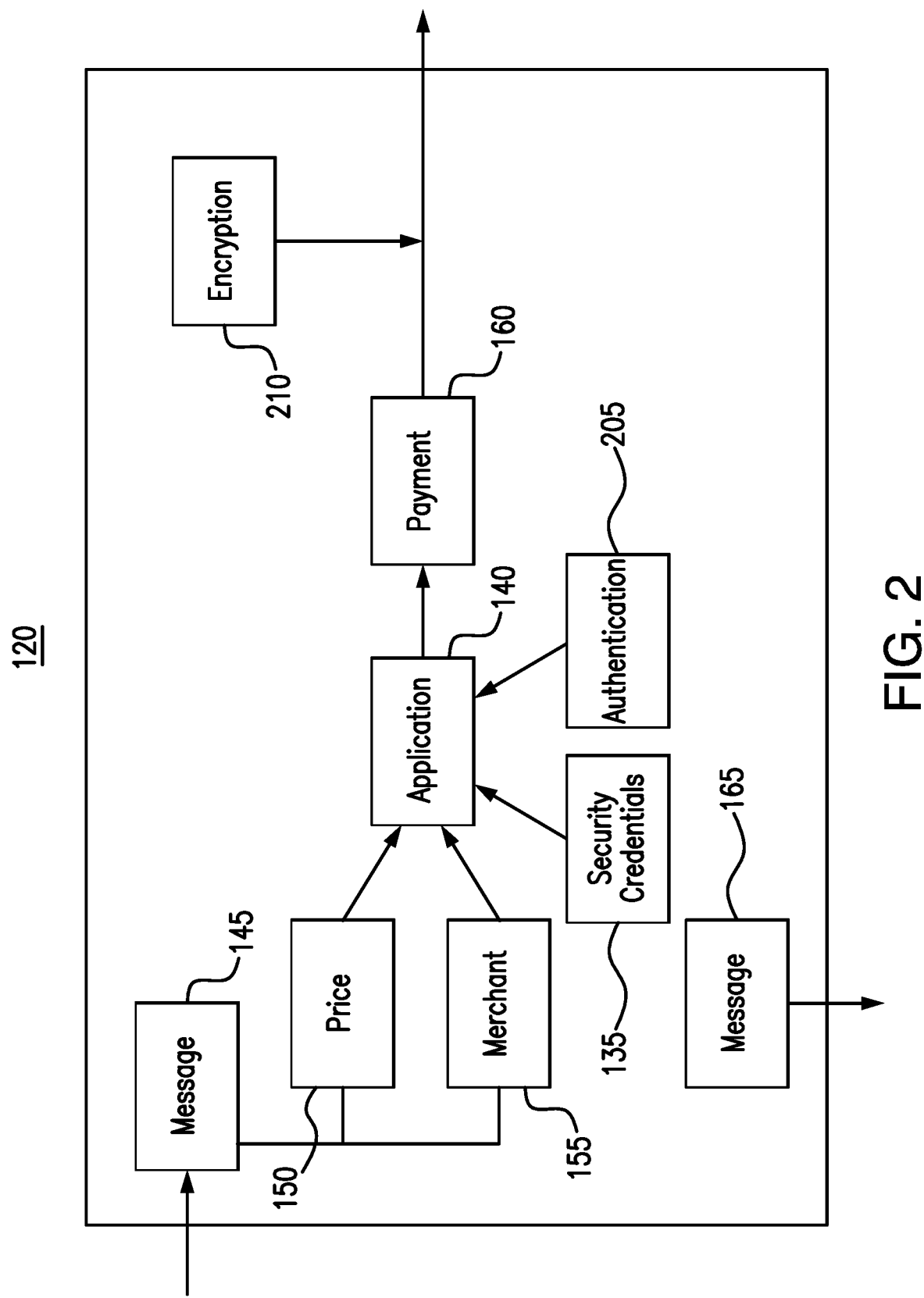
FIG. 2 illustrates an example security tool of the system of FIG. 1.
Figure 3:
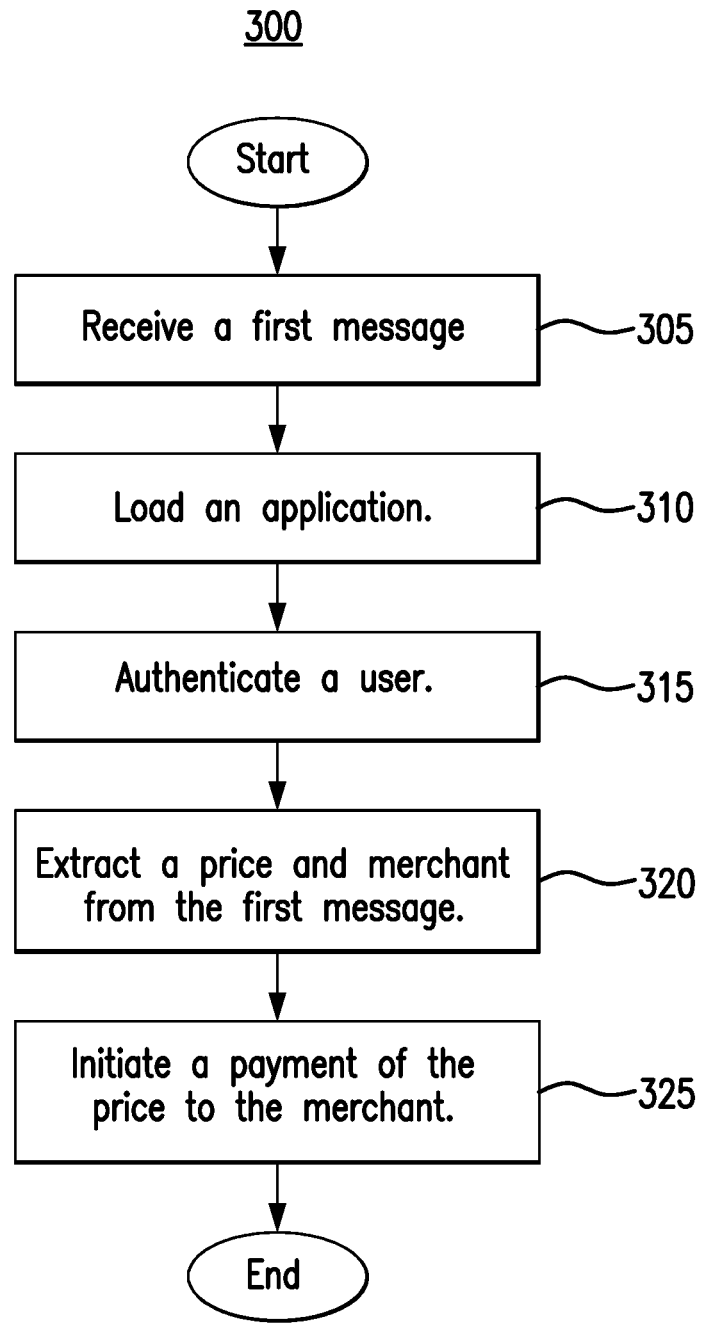
FIG. 3 is a flowchart illustrating a method for improving security using the system of FIG. 1.

Embodiments of the present disclosure and its advantages are best understood by referring to FIGS. 1 through 3 of the drawings, like numerals being used for like and corresponding parts of the various drawings.

Computers and mobile devices are increasingly used to perform transactions with merchants. For example, users can use their mobile phones to initiate purchases and payments with merchants. Additionally, merchants can use connected and/or mobile terminals to accept and process payments. Some devices offer better security for these transactions than other devices. For example, mobile devices may perform certain types of authentication and encryption that other devices (e.g., cash registers, credit card scanners, etc.) will not perform. As a result, it may be more secure to pay for a transaction using a mobile device.

Furthermore, users use televisions to watch streaming videos. It is contemplated that these streams will include a layer to identify and present to the user offers for products that appear in these videos. The user can then purchase these products through the television. Televisions, however, typically do not perform the same types of authentication and encryption that other devices perform. As a result, the user's transaction through the television may not be secure and may result in the user being hacked or having the user's identity stolen.

This disclosure contemplates a security tool that improves the security of transactions initiated through a streamed video on a television. The security tool (e.g., a mobile device) listens for and receives messages from a network indicating that a transaction has been initiated on the television. In response, the security tool loads an application and extracts price and merchant information for the transaction from the message. The security tool then authenticates a user and initiates payment of the price to the merchant. In this manner, the sensitive portions of the transaction (e.g., payment) are not conducted through the television, but rather, through a device that can provide security for the user. In certain embodiments, the security tool improves the security of the transaction and reduces the risk that the user will be hacked and/or have his identity stolen. The security tool will be described in more detail using FIGS. 1 through 3.

FIG. 1 illustrates an example system 100. As shown in FIG. 1, system 100 includes user 105, merchant 108, a television 110, one or more devices 113, a network 115, and a security tool 120. In particular embodiments, system 100 improves the security of a transaction initiated through television 110.

User 105 watches shows and/or programming on television 110. In some instances, the shows and/or programs are streamed to television 110 over network 115. Television 110 presents a video 111 to user 105. In some instances, video 111 is streamed to television 110. The stream may contain a layer that identifies products (also referred to as items) shown in video 111. As seen in FIG. 1, television 110 presents video 111 and another layer that presents items 112 to user 105. Television 110 can present offers for one or more items 112 to user 105 to see if user 105 wants to purchase the items 112 that appear in video 111. If user 105 wants to purchase items 112, user 105 can initiate and perform a transaction that purchases one or more items 112 through television 110.

When user 105 initiates a transaction using television 110, television 110 communicates payment information over network 115 to merchant 108. Merchant 108 receives the payment information on one or more devices 113. Devices 113 may be any device that can process payment information for merchant 108 such as a laptop, mobile device, a personal computer, a cash register, etc. After merchant 108 receives the payment information, merchant 108 can send the purchased item 112 to user 105.

Devices 113 include any appropriate device for communicating with components of system 100 over network 115. For example, devices 113 may be a telephone, a mobile phone, a computer, a laptop, a tablet, an automated assistant, and/or a cash register. This disclosure contemplates device 113 being any appropriate device for sending and receiving communications over network 115. As an example and not by way of limitation, device 113 may be a computer, a laptop, a wireless or cellular telephone, an electronic notebook, a personal digital assistant, a tablet, or any other device capable of receiving, processing, storing, and/or communicating information with other components of system 100. Device 113 may also include a user interface, such as a display, a microphone, keypad, or other appropriate terminal equipment usable by user 105. In some embodiments, an application executed by device 113 may perform the functions described herein.

Performing transaction through television 110 may expose user 105 to certain security risks. For example, television 110 may not perform the same authentication and encryption procedures that other devices perform. As a result, when user 105 communicates payment information through television 110, user 105 may have his payment information intercepted and/or stolen by hackers and/or thieves. As a result, user 105 is exposed to the risk of having his identity stolen and of future fraudulent transactions performed under user's 105 name.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 100 includes a security tool 120 that improves the security transactions that user 105 initiates through television 110. In some embodiments, security tool 120 is a mobile device of user 105. As shown in FIG. 1, security tool 120 includes a processor 125 and a memory 130. This disclosure contemplates processor 125 and memory 130 being configured perform any of the functions and/or tasks of security tool 120 described herein. Generally, security tool 120 intercepts and/or receives transaction information communicated by television 110. Security tool 120 then performs authentication and encryption procedures that television 110 does not perform. Security tool 120 then initiates and completes payment for the transaction and alerts television 110 that the transaction is complete. In this manner, security tool 120 performs authentication and encryption procedures that improve the security of the transaction. In some instances, television 110 does not perform these authentication and encryption procedures and thus exposes user 105 to security risks. Security tool 120 can reduce these risk by performing the authentication and encryption procedures.

Processor 125 is any electronic circuitry, including, but not limited to microprocessors, application specific integrated circuits (ASIC), application specific instruction set processor (ASIP), and/or state machines, that communicatively couples to memory 130 and controls the operation of security tool 120. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of security tool 120 by processing information received from television 110, network 115, device(s) 113, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Memory 130 stores security credentials 135 from user 105. Security credentials 135 may include any information that can be used to authenticate user 105. For example, security credentials 135 may include a username, a password, a picture, a fingerprint, and/or voice signal of user 105. Security tool 120 may use security credentials 135 to authenticate user 105. This disclosure contemplates security credentials 135 using any information related to user 105 that can be used to authenticate user 105.

Memory 130 stores an application 140. Application 140 is an executable program that security tool 120 executes to improve the security of a transaction initiated through television 110. Application 140 can be loaded automatically by security tool 120 when security tool 120 determines that a transaction has been initiated through television 110. Application 140 then performs certain functions such as authentication and encryption to improve the security of the transaction.

In certain embodiments, security tool 120 registers application 140 over network 115 and/or with television 110 so that the device in network 115 knows that messages communicated from television 110 to devices 113 should instead be communicated to security tool 120. After registration, security tool 120 is able to intercept messages 145 communicated from television 110. After security tool 120 receives message 145, security tool 120 can load application 140. Security tool 120 can then execute application 140 to perform the various authentication and encryption procedures that improves the security of the transaction.

When user 105 initiates a transaction through television 110, television 110 communicates a message over network 115 intended for device 113. Security tool 120 intercepts that message 145 before it reaches device 113. Message 145 may identify the transaction and may include any information related to the transaction. For example, message 145 may include an identification of item 112, the price of item 112, and the identification of merchant 108. When security tool 120 receives message 145, security tool 120 determines that user 105 initiated a transaction through television 110. Security tool 120 may then perform certain procedures that improve the security of that transaction.

Security tool 120 and/or application 140 may parse message 145 to extract information about the transaction from message 145. For example, application 140 and/or security tool 120 may parse and extract a price 150 and an identification of merchant 108 from message 145. This information may be included in message 145 as information related to the transaction. This extracted information can then be used to initiate and/or complete payment for the transaction.

Security tool 120 and/or application 140 authenticate user 105 using security credentials 135. For example, security tool 120 may compare information provided by user 105 with information in security credentials to authenticate user 135. User 105 may provide any information related to user 105 to perform authentication. This disclosure contemplates user 105 providing, for example, a username, password, fingerprint, voice signature, and/or facial scan. Security tool compares the provided information against information in security credentials 135 (e.g., fingerprint, voice signature, and/or picture) to determine whether user 105 is authenticated. For example, if the information provided by user 105 matches the information stored in credentials 135, then security tool 120 may determine that user 105 is authenticated.

Security tool 120 and/or application 140 use price 150 and merchant 155 to create a payment message 160. After authentication, security tool 120 communicates payment 160 to device 113 to complete the transaction. Payment 160 may indicate that price 150 should be paid to merchant 108. Security tool 120 may encrypt message 160 so that even if payment message 160 is intercepted and/or stolen, the information within payment 160 may not be stolen, which protects users 105 from future identity theft.

After payment 160 is communicated to device 113, security tool 120 communicates message 165 to television 110. Message 165 indicates that the requested transaction has been paid. In response to receiving message 165, television 110 may continue presenting video 111 to user 105. In other words, message 165 alerts television 110 that the transaction is complete. Because message 145 may have been intercepted by security tool 120, message 165 may be needed to alert television 110 that device 113 has completed the transaction.

In particular embodiments, system 100 improves the security of transaction initiated through television 110 by using security tool 120. Security tool 120 performs authentication and encryption procedures that television 110 does not perform, thus security tool 120 improves the security of the transactions and reduces the risks that user 105 may be exposed to identity theft.

FIG. 2 illustrates security tool 120 of system 100 of FIG. 1. As seen in FIG. 2, security tool 120 performs certain authentication and encryption procedures that improve the security of a transaction initiated through a television.

Message 145 may be generated by the television in response to a user initiating a transaction through the television. The television may intend to communicate message 145 over a network to a merchant. Security tool 120 may intercept message 145 before it reaches the merchant. Message 145 may identify the transaction and include any information related to the transaction. In some embodiments the transaction was initiated by the user while the television was presenting a streamed video.

Security tool 120 loads an application 140 in response to receiving message 145. Application 140 is executed to complete the transaction. Execution of application 140 may cause security tool 120 to perform any of the functions of security tool 120 described herein. For example, application 140 may parse message 145 to extract price 150 and merchant 155 from message 145. Application 140 may also perform the authentication and encryption procedures of security tool 120.

Security tool 120 may determine from message 145 that the user has initiated a transaction through the television. In response, security tool 120 extracts information from message 145 such as, for example, price 150 and an identification of merchant 155. Security tool 120 uses this extracted information to initiate payment for the transaction.

Application 140 may authenticate the user that initiated the transaction. For example, application 140 may use security credentials 135 to authenticate the user. This disclosure contemplates security tool 120 performing any suitable type of authentication (e.g. biometric authentication, 2-factor authentication, etc.). Security credentials 135 may include a username, a password, a fingerprint, a picture, and/or a voice signature of the user. Application 140 may perform authentication 205 to authenticate the user. Authentication procedure 205 may include the user providing information that is matched against security credentials 135. For example, the user may provide a username, a password, and/or biometric information such as, for example, a fingerprint, a voice signal, and/or a face scan through authentication procedure 205. Application 140 may then compare the provided information against security credentials 135 to authenticate the user. If the user is not authenticated, then application 140 may reject the transaction identified by message 145. If the user is authenticated, then application 140 may allow the transaction to proceed. In certain embodiments, authentication procedure 205 improves the security of the transaction because television 110 may not perform the authentication procedure 205. For example, television 110 may not allow the user to supply a password, a fingerprint, a facial scan, and/or voice signal.

After the user is authenticated, application 140 may generate payment message 160. Payment message 160 may include information to complete payment for the transaction. For example, payment message includes price 150 and merchant 155. Payment 160 may also include identification information for the user.

In certain embodiments, security tool 120 may ask the user to select from one or more payment methods, such as, for example, a savings account, a checking account, or a credit card. The user may select the payment method. Security tool 120 may then include in payment message 160 information related to the selected payment method. For example, payment message 160 may include routing numbers, account numbers, and/or credit card numbers. Security tool 120 may then communicate payment message 160 to initiate payment using the selected payment method. In some embodiments, security tool 120 communicates payment message 160 to a merchant. Upon receiving payment message 160, the merchant processes payment message 160 to complete payment for the transaction. The merchant may then deliver the purchased item to the user.

Security tool 120 may perform an encryption procedure 210 on payment message 160 before communicating payment message 160 to a merchant. Encryption procedure 210 may make it difficult to steal or discern the information within payment message 160. After performing encryption procedure 210, even if payment message 160 is intercepted or stolen, the sensitive information contained within payment message 160 may not be stolen. In certain embodiments, encryption procedure 210 improves the security of the transaction because television 110 may not perform encryption procedure 210. Thus, by performing encryption procedure 210, security tool 120 reduces the chances that the user will be exposed to the risk of identity theft. This disclosure contemplates security tool 120 performing any suitable encryption procedure 210.

Security tool 120 generates message 165 to indicate that the transaction has been completed. Security tool 120 communicates message 165 to the television to alert the television that the transaction is completed. In response to receiving message 165, the television may return to presenting the streamed video.

FIG. 3 is a flowchart, illustrating a method 300 for improving security using the system 100 of FIG. 1. In certain embodiments, security tool 120 performs method 300. By performing method 300, security tool 120 improves the security of a transaction initiated through a television. Such as, for example, a transaction initiated while the television was presenting a streamed video.

Security tool 120 begins by receiving a first message in step 305. The first message may indicate to security tool 120 that a transaction has been initiated through a television. In step 310, security tool 120 loads an application. The application may be executed to process the transaction initiated through the television.

Security tool 120 authenticates a user in step 315. Security tool 120 may use security credentials and any information supplied by the user to authenticate the user. After the user is authenticated, security tool 120 extracts a price and a merchant from the first message in step 320. The extracted information is used to complete the transaction.

In step 325, security tool 120 initiates a payment of the price to the merchant. In some embodiments, security tool 120 may encrypt the payment message before communicating the message to the merchant. In this manner, the sensitive information, within the payment message, may not be stolen even if the payment message itself is intercepted. As a result, the security of the transaction is improved because the authentication and encryption procedures performed by security tool 120 reduced the chances the user will have his identity stolen. These authentication and encryption procedures may not be performed by the television. Thus, because security tool 120 performs the authentication and encryption procedures, security tool 120 provides a safer way to conduct transactions initiated through the television.

Modifications, additions, or omissions may be made to method 300 depicted in FIG. 3. Method 300 may include more, fewer, or other steps. For example, steps may be performed in parallel or in any suitable order. While discussed as security tool 120 (or components thereof) performing the steps, any suitable component of system 100, such as device(s) 113 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a memory configured to store security credentials of a user and an application; and
   a hardware processor communicatively coupled to the memory, the hardware processor configured to:
   register the application with a television, wherein:
   registering the application reconfigures one or more devices within a network to reroute messages that are initiated by the television to a merchant to the application; and
   registering the application enables the application to intercept communications between the television and the merchant;

receive a first message initiated by the television and destined for the merchant, wherein:
the first message indicates that the user initiated a transaction for a product through the television;
receiving the first message prevents the first message from reaching the merchant; and
the transaction was initiated through the television while the television was presenting a streamed video that comprises a layer that identifies and presents an offer for the product that appears in the video;
load the application in response to receiving the first message;
authenticate the user through the application using the security credentials of the user;
extract, from the first message, a price and an identification of the merchant of the transaction;
send a second message to the merchant to initiate a payment of the price to the merchant; and
communicate a third message to the television, the third message indicating that the transaction has been paid.

2. The apparatus of claim 1, wherein the hardware processor is further configured to implement, through the application, at least one of an encryption procedure and an authentication procedure not implemented by the television.

3. The apparatus of claim 1, wherein the hardware processor is embodied in a mobile device.

4. The apparatus of claim 1, wherein registering the application provides the application authorization to receive the first message.

5. The apparatus of claim 1, wherein the hardware processor is further configured to perform biometric authentication to authenticate the user.

6. The apparatus of claim 1, wherein the hardware processor is further configured to:
receive, from the user, a selection between a first payment method and a second payment method; and
initiate the payment using the selection.

7. The apparatus of claim 1, wherein the hardware processor is further configured to receive a username and a password to authenticate the user.

8. A method comprising:
storing, by a memory, security credentials of a user;
registering, by a hardware processor communicatively coupled to the memory, the application with a television, wherein:
registering the application reconfigures one or more devices within a network to reroute messages that are initiated by the television to a merchant to the application; and
registering the application enables the application to intercept communications between the television and the merchant;
receiving, by the hardware processor, a first message initiated by the television and destined for the merchant, wherein:
the first message indicates that the user initiated a transaction for a product through the television;
receiving the first message prevents the first message from reaching the merchant; and
the transaction was initiated through the television while the television was presenting a streamed video that comprises a layer that identifies and presents an offer for the product that appears in the video;
loading, by the hardware processor, the application in response to receiving the first message;
authenticating, by the hardware processor, the user through the application using the security credentials of the user;
extracting, by the hardware processor, from the first message, a price and an identification of a merchant of the transaction;
sending, by the hardware processor, a second message to the merchant to initiate a payment of the price to the merchant; and
communicating, by the hardware processor, a third message to the television, the third message indicating that the transaction has been paid.

9. The method of claim 8, further comprising implementing, by the hardware processor, through the application, at least one of an encryption procedure and an authentication procedure not implemented by the television.

10. The method of claim 8, wherein the hardware processor is embodied in a mobile device.

11. The method of claim 8, wherein registering the application provides the application authorization to receive the first message.

12. The method of claim 8, further comprising performing, by the hardware processor, biometric authentication to authenticate the user.

13. The method of claim 8, further comprising:
receiving, by the hardware processor, from the user, a selection between a first payment method and a second payment method; and
initiating, by the hardware processor, the payment using the selection.

14. The method of claim 8, further comprising receiving, by the hardware processor, a username and a password to authenticate the user.

15. A system comprising:
a television configured to:
present a streamed video to a user; and
present an offer for a product in the streamed video, the streamed video comprises a layer that identifies and presents the offer for the product that appears in the video; and
a security tool configured to:
store security credentials of the user and an application;
register the application with a television, wherein:
registering the application reconfigures one or more devices within a network to reroute messages that are initiated by the television to a merchant to the application; and
registering the application enables the application to intercept communications between the television and the merchant;
receive a first message initiated by the television and destined for the merchant, wherein:
the first message indicates that the user initiated a transaction through the television for the product when the television was presenting the streamed video; and
receiving the first message prevents the first message from reaching the merchant;
load the application in response to receiving the first message;
authenticate the user through the application using the security credentials of the user;
extract, from the first message, a price and an identification of a merchant of the transaction;
send a second message to the merchant to initiate a payment of the price to the merchant; and communicate a third message to the television, the third message indicating that the transaction has been paid.

16. The system of claim 15, wherein the security tool is further configured to implement, through the application, at least one of an encryption procedure and an authentication procedure not implemented by the television.

17. The system of claim 15, wherein registering the application provides the application authorization to receive the first message.

18. The system of claim 15, wherein the security tool is further configured to perform biometric authentication to authenticate the user.

19. The system of claim 15, wherein the security tool is further configured to:
receive, from the user, a selection between a first payment method and a second payment method; and
initiate the payment using the selection.

20. The system of claim 15, wherein the security tool is further configured to receive a username and a password to authenticate the user.

* * * * *